(12) United States Patent
Kanazawa et al.

(10) Patent No.: US 11,768,341 B2
(45) Date of Patent: Sep. 26, 2023

(54) PACKAGE FOR OPTICAL MODULE

(71) Applicant: Nippon Telegraph and Telephone Corporation, Tokyo (JP)

(72) Inventors: Shigeru Kanazawa, Musashino (JP); Takahiko Shindo, Musashino (JP); Meishin Chin, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/639,822

(22) PCT Filed: Sep. 18, 2019

(86) PCT No.: PCT/JP2019/036620
§ 371 (c)(1),
(2) Date: Mar. 2, 2022

(87) PCT Pub. No.: WO2021/053764
PCT Pub. Date: Mar. 25, 2021

(65) Prior Publication Data
US 2022/0326455 A1 Oct. 13, 2022

(51) Int. Cl.
*G02B 6/42* (2006.01)
*H04B 10/00* (2013.01)

(52) U.S. Cl.
CPC ........... *G02B 6/428* (2013.01); *G02B 6/4293* (2013.01)

(58) Field of Classification Search
CPC combination set(s) only.
See application file for complete search history.

(56) References Cited

U.S. PATENT DOCUMENTS 5,879,173 A * 3/1999 Poplawski ......... H01R 13/6582
439/138
6,220,765 B1 * 4/2001 Tatoh .................. H01L 31/0203
385/94

(Continued)

FOREIGN PATENT DOCUMENTS

| JP | 2002-343982 A | 11/2002 |
| JP | 2005-236298 A | 9/2005 |
| JP | 2011-69848 A | 4/2011 |

OTHER PUBLICATIONS

Shigeru Kanazawa et al., *Equalizer-Free Transmission of 100-GB/s 4-PAM signal Generated by Flip-Chip Interconnection EADFB Laser Module*, Journal of Lightwave Technology, vol. 35, No. 4, 2017, pp. 775-780.

*Primary Examiner* — Agustin Bello
(74) *Attorney, Agent, or Firm* — Workman Nydegger (57) ABSTRACT

There is provided a highly convenient package for an optical module in which a device can be mounted as it is even when the number and mounting position thereof are different according to the device to be mounted. The package includes a base plate having a top surface on which devices are assembled, an optical fiber mounting component mounted on the top surface of the base plate, a direct current electrical interface component and a high frequency electrical interface component mounted on the top surface of the base plate. The optical fiber mounting component and the electrical interface components are separately manufactured, separately assembled on the top surface of the base plate, and fixed in different modes. The optical fiber mounting component is fixed by fastening with screws and fixed by soldering, and the electrical interface components are fixed by fastening with the screw.

14 Claims, 5 Drawing Sheets

(56) References Cited

U.S. PATENT DOCUMENTS

| | | | | |
|---|---|---|---|---|
| 6,592,269 | B1* | 7/2003 | Brophy | G02B 6/4246 385/92 |
| 6,692,159 | B2* | 2/2004 | Chiu | G02B 6/4261 385/53 |
| 6,739,764 | B2* | 5/2004 | Ido | G02B 6/4265 385/94 |
| 6,824,314 | B2* | 11/2004 | Bendelli | G02B 6/4255 385/94 |
| 6,876,682 | B2* | 4/2005 | Nakabayashi | H01S 5/02251 372/36 |
| 6,974,261 | B1* | 12/2005 | McKinley | G02B 6/4244 385/88 |
| 7,115,821 | B1* | 10/2006 | Sonderegger | G02B 6/4201 174/520 |
| 7,144,788 | B2* | 12/2006 | Kihara | G02B 6/4279 257/E21.44 |
| 7,317,742 | B2* | 1/2008 | Saito | G02B 6/4292 372/50.1 |
| 7,771,071 | B2* | 8/2010 | Finot | G02B 7/008 359/260 |
| 8,059,415 | B2* | 11/2011 | Nelson | G02B 6/4201 361/752 |
| 8,083,417 | B2* | 12/2011 | Aronson | G02B 6/3817 385/88 |
| 8,908,727 | B2* | 12/2014 | Wu | H01S 5/02208 372/43.01 |
| 8,923,348 | B2* | 12/2014 | Liu | H01S 3/10 372/20 |
| 9,178,331 | B2* | 11/2015 | Bukkems | G02B 6/4269 |
| 9,337,611 | B2* | 5/2016 | Daiber | H01S 5/0085 |
| 9,548,817 | B1* | 1/2017 | Nagarajan | H01S 5/0064 |
| 10,205,298 | B2* | 2/2019 | Liu | H01S 5/06821 |
| 10,451,810 | B1* | 10/2019 | Shalom | G02B 6/428 |
| 10,681,832 | B1* | 6/2020 | Leigh | H05K 1/0274 |
| 10,852,496 | B2* | 12/2020 | Schwerzig | G02B 6/426 |
| 11,171,463 | B2* | 11/2021 | Tu | H01S 5/0651 |
| 11,563,136 | B2* | 1/2023 | Heanue | H01L 31/024 |
| 2002/0060840 | A1* | 5/2002 | Tatoh | G02B 6/4271 359/341.1 |
| 2002/0131730 | A1* | 9/2002 | Keeble | G02B 6/4246 385/88 |
| 2002/0167977 | A1* | 11/2002 | Nakabayashi | H01S 5/02251 372/36 |
| 2002/0172476 | A1* | 11/2002 | Nagase | G02B 6/4204 385/94 |
| 2003/0059175 | A1* | 3/2003 | Bendelli | G02B 6/424 385/92 |
| 2003/0123819 | A1* | 7/2003 | Nakanishi | G02B 6/4214 385/88 |
| 2003/0128552 | A1* | 7/2003 | Takagi | G02B 6/4221 362/555 |
| 2003/0133685 | A1* | 7/2003 | Horishita | G02B 6/426 385/134 |
| 2003/0180003 | A1* | 9/2003 | Yang | G02B 6/4228 385/88 |
| 2004/0100686 | A1* | 5/2004 | Flanders | H01S 5/02216 359/341.1 |
| 2004/0101016 | A1* | 5/2004 | McDonald | H01S 5/02325 372/97 |
| 2004/0114883 | A1* | 6/2004 | Furuichi | G02B 6/4206 385/88 |
| 2005/0121684 | A1* | 6/2005 | Aruga | G02B 6/4292 257/98 |
| 2005/0135775 | A1* | 6/2005 | Kao | G02B 6/4279 385/147 |
| 2005/0213882 | A1* | 9/2005 | Go | H01S 5/02216 385/37 |
| 2005/0214957 | A1* | 9/2005 | Kihara | H01S 5/02216 438/106 |
| 2005/0276547 | A1* | 12/2005 | Wang | H05K 1/147 385/88 |
| 2006/0006403 | A1* | 1/2006 | Matsushima | G02B 6/4274 257/433 |
| 2006/0083517 | A1* | 4/2006 | Saito | G02B 6/4272 398/140 |
| 2006/0133819 | A1* | 6/2006 | Yu | H05K 1/147 398/164 |
| 2008/0144997 | A1* | 6/2008 | Tai | G02B 6/4201 228/122.1 |
| 2009/0003398 | A1* | 1/2009 | Moto | H01S 5/02216 372/36 |
| 2009/0224645 | A1* | 9/2009 | Ichikawa | G02B 6/428 313/51 |
| 2011/0031385 | A1* | 2/2011 | Ishigami | G02B 6/428 250/239 |
| 2011/0032955 | A1* | 2/2011 | Daiber | H01S 5/02446 372/20 |
| 2011/0207344 | A1* | 8/2011 | McColloch | G02B 6/428 29/874 |
| 2011/0255832 | A1* | 10/2011 | Zhao | G02B 6/428 385/88 |
| 2012/0014398 | A1* | 1/2012 | Choi | H01S 5/02251 372/20 |
| 2012/0019903 | A1* | 1/2012 | Nakagawa | G02B 6/4245 359/344 |
| 2013/0004120 | A1* | 1/2013 | Zbinden | G02B 6/4293 385/14 |
| 2013/0034329 | A1* | 2/2013 | Tucker | G02B 6/428 385/94 |
| 2013/0108224 | A1* | 5/2013 | Ishigami | G02B 6/4284 385/89 |
| 2013/0128467 | A1* | 5/2013 | Tsujino | H01L 23/49811 361/728 |
| 2013/0156385 | A1* | 6/2013 | Ishigami | G02B 6/4219 385/92 |
| 2013/0177034 | A1* | 7/2013 | Liu | H01S 5/02325 372/20 |
| 2013/0188912 | A1* | 7/2013 | Bimboese | G02B 6/4285 385/60 |
| 2013/0209038 | A1* | 8/2013 | Pommer | G02B 6/4245 385/76 |
| 2013/0272662 | A1* | 10/2013 | Mori | G02B 6/3885 385/88 |
| 2013/0272663 | A1* | 10/2013 | Katou | G02B 6/428 385/88 |
| 2013/0287404 | A1* | 10/2013 | McColloch | G02B 6/4246 439/78 |
| 2013/0303025 | A1* | 11/2013 | Faith | G02B 6/4284 439/620.21 |
| 2014/0022734 | A1* | 1/2014 | Yamada | H04B 10/60 361/728 |
| 2014/0193122 | A1* | 7/2014 | Wu | G02B 6/4416 385/101 |
| 2014/0227908 | A1* | 8/2014 | Satoh | H01R 13/516 439/620.15 |
| 2014/0294395 | A1* | 10/2014 | Waldron | G02B 6/3853 398/115 |
| 2015/0023671 | A1* | 1/2015 | Bradley | H04B 10/40 29/834 |
| 2015/0078408 | A1* | 3/2015 | Bukkems | G02B 6/428 372/20 |
| 2015/0163912 | A1* | 6/2015 | Reuven | H05K 1/184 361/783 |
| 2016/0004021 | A1* | 1/2016 | Pelletier | G02B 6/421 385/14 |
| 2016/0116695 | A1* | 4/2016 | Ekado | G02B 6/421 385/14 |
| 2016/0195684 | A1* | 7/2016 | De Bruijn | G02B 6/4231 385/92 |
| 2016/0291271 | A1* | 10/2016 | Mizobuchi | G02B 6/428 |
| 2017/0059784 | A1* | 3/2017 | Gniadek | G02B 6/3875 |
| 2017/0162987 | A1* | 6/2017 | Kasturi | H01R 12/53 |
| 2018/0259731 | A1* | 9/2018 | Dupeux | G02B 6/4271 |
| 2018/0306990 | A1* | 10/2018 | Badihi | G02B 6/4452 |
| 2019/0346637 | A1* | 11/2019 | Schwerzig | G02B 6/426 |

(56) References Cited

U.S. PATENT DOCUMENTS

2020/0081208 A1\* 3/2020 Leigh ................... G02B 6/421
2021/0247574 A1\* 8/2021 Haase .................. G02B 6/4214
2022/0326455 A1\* 10/2022 Kanazawa ........... G02B 6/4244

\* cited by examiner

PACKAGE FOR OPTICAL MODULE

TECHNICAL FIELD

The present invention relates to a package for an optical module used in an optical transceiver in an optical communication system.

BACKGROUND ART

Conventionally, when an optical module in which a device (a component) such as an optical semiconductor chip is mounted is manufactured, an optical fiber serving as an optical interface and a metal terminal or a high frequency connector serving as an electrical interface are required.

Because the number, size, and arrangement of these devices are different for each device, it is necessary to manufacture a package for an optical module suitable for the device to be mounted. When a device including an optical semiconductor chip is mounted on such a package, the package can be modularized.

Figure 1:
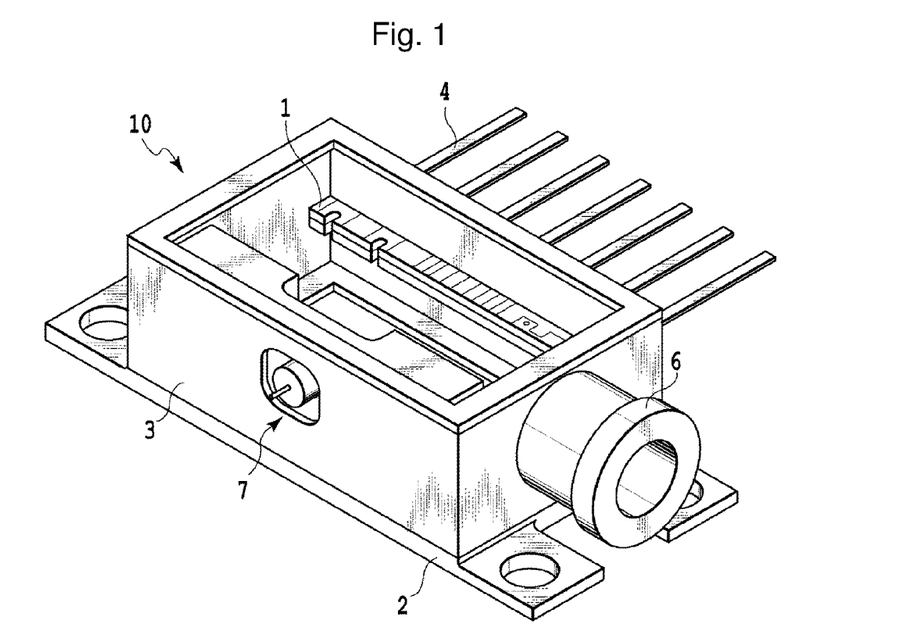
FIG. 1 is an external perspective view illustrating a schematic configuration of a conventional package for an optical module.

FIG. 1 is an external perspective view illustrating a schematic configuration of a conventional package 10 for an optical module. A component assembly frame 3 is mounted in the package 10 for an optical module as an insulator for assembling the device on a main surface of a base plate 2. The component assembly frame 3 is constituted of a rectangular frame formed only by side surfaces with no upper surface and lower surface.

As a specific description of the assembly of the components, an optical fiber mounting part 6 for mounting an optical fiber is provided on a transverse side surface of the component assembly frame 3. The optical fiber mounting part 6 may be manufactured integrally with the component assembly frame 3, or may be manufactured as a separate component and then mounted on and fixed to a dedicated mounting part provided on the transverse side surface of the component assembly frame 3.

Further, a high frequency connector 7 is provided on a first longitudinal side surface of the component assembly frame 3, being exposed so that the high frequency connector 7 is connectable to a connector of the connection target. Furthermore, a direct current (DC) wiring board 1 to which a plurality of metal terminals 4 serving as electrical interfaces are connected and fixed is mounted on a second longitudinal side surface of the component assembly frame 3 which faces the first longitudinal side surface. The connection and fixing of the metal terminals 4 to the direct current wiring board 1 are typically performed by mounting the direct current wiring board 1 from the inside of the second longitudinal side surface of the component assembly frame 3 and then fixing the metal terminals 4 to connection locations of the direct current wiring board 1 by soldering or the like.

An example of a device mounted in a package used in an optical transceiver is a CMOS digital/analog converter (refer to NPL 1).

CITATION LIST

Non Patent Literature

NPL 1: S. Kanazawa et al., "Equalizer-free transmission of 100-Gbit/s 4-PAM signal generated by flip-chip interconnection EADFB laser module," DOI #10.1109/JLT 2016.2598844

In the case of the above-described package 10 for an optical module, for example, the numbers and mounting positions of optical interfaces, electrical interfaces, and the like are different according to the device to be mounted. Therefore, because a package for an optical module suitable for a device to be mounted has to be manufactured case by case, there has been an unresolved problem with inconvenience in which the device cannot be mounted as it is.

SUMMARY OF THE INVENTION

An embodiment according to the present invention has been made to solve the above problems. An object of the embodiment according to the present invention is to provide a highly convenient package for an optical module in which a device can be mounted as it is, even when the number and mounting position thereof are different according to the device to be mounted.

To achieve the above object, a package for an optical module according to one aspect of the present invention includes a base plate having a top surface on which a plurality of devices are assembled, an optical fiber mounting component mounted on the top surface of the base plate as one of the plurality of devices, the optical fiber mounting component being a separate component from the base plate, and an electrical interface component mounted on the top surface of the base plate as one of the plurality of devices, the electrical interface component being a separate component from the base plate and the optical fiber mounting component, wherein the optical fiber mounting component and the electrical interface component are separately assembled on the top surface of the base plate and are fixed in different modes.

With the package for the optical module having the above-described configuration, the device can be mounted as it is, even when the number and mounting position thereof is different according to the device to be mounted, and thus convenience can be increased.

BRIEF DESCRIPTION OF DRAWINGS

FIG. 3 is an external perspective view illustrating a component configuration of the package for an optical module illustrated in FIG. 2 in a deployed state.

FIG. 4 is a view of a detailed configuration of the package for an optical module illustrated in FIG. 2 including an optical fiber of a connecting component.

FIG. 5 is an external perspective view illustrating a configuration of an alternative component which is another example of the high frequency electrical interface component illustrated in FIG. 3(d).

DESCRIPTION OF EMBODIMENTS

Hereinafter, a package for an optical module according to an embodiment of the present invention will be described in detail with reference to the accompanying drawings.

First Embodiment

Figure 2:
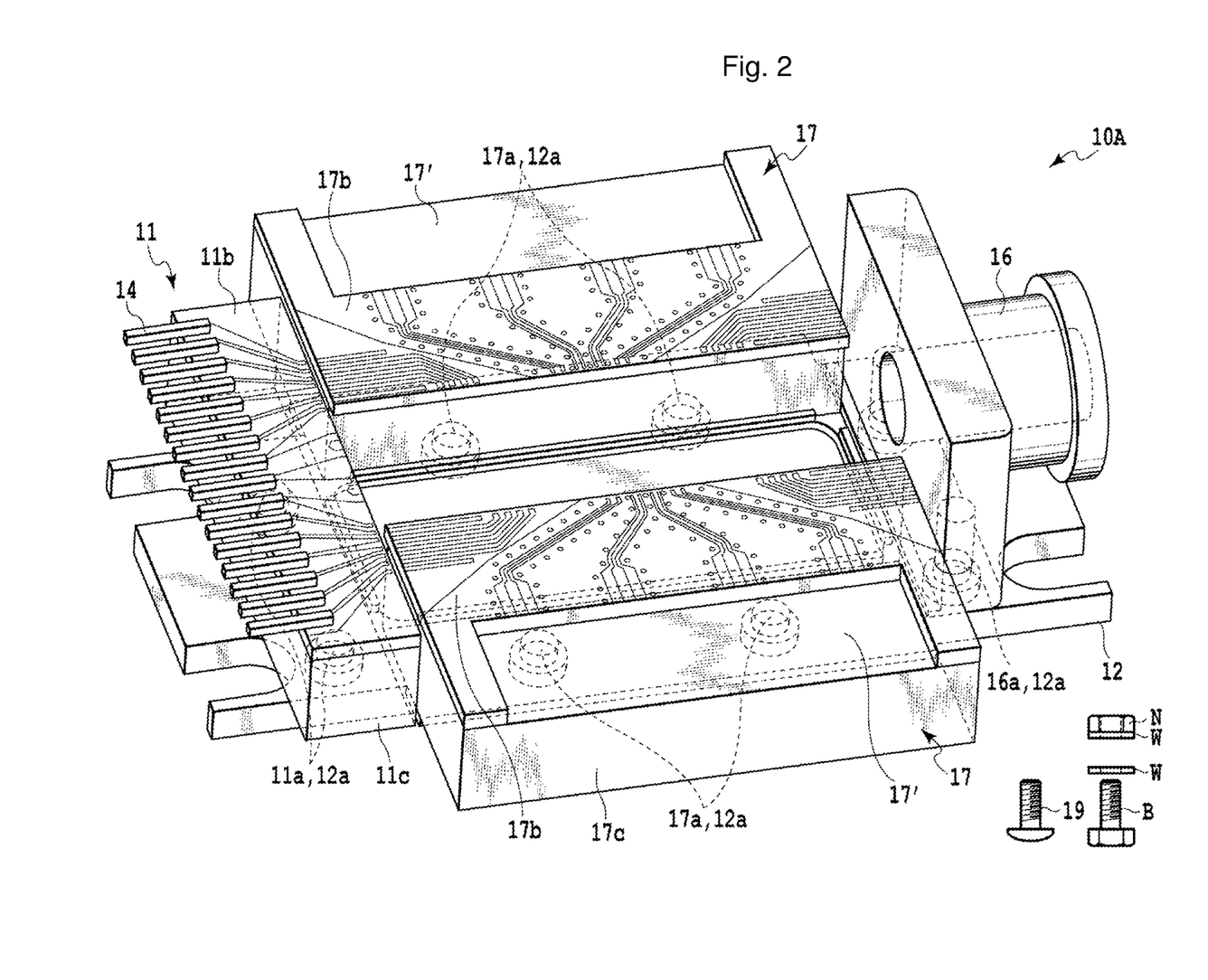
FIG. 2 is an external perspective view illustrating a schematic configuration of a package for an optical module according to a first embodiment of the present invention.
Figures 3A, 3B, 3C, 3D:
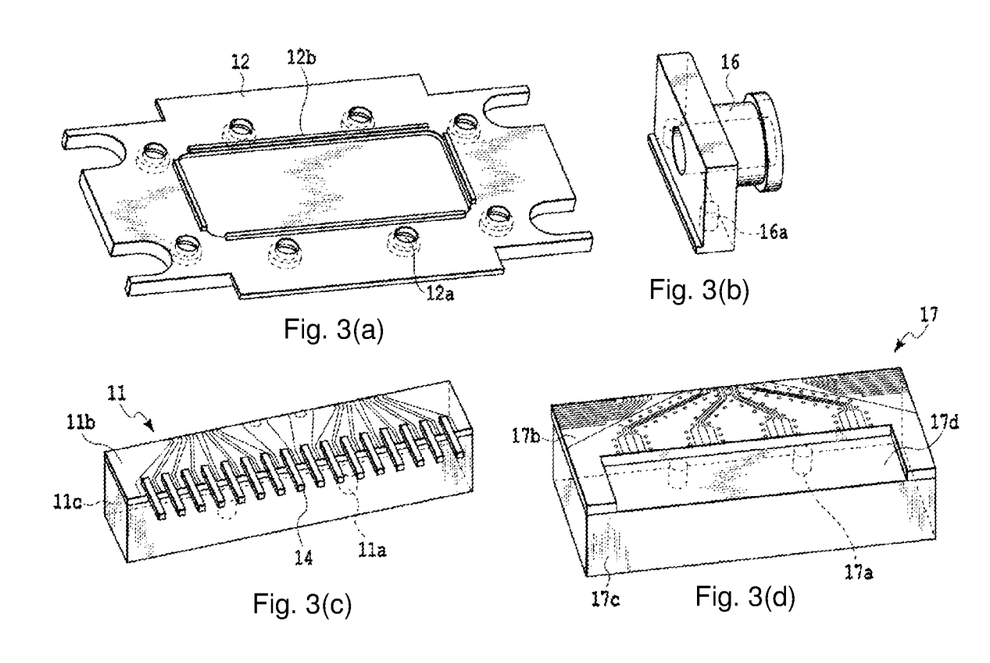
FIG. 3(a) is an external perspective view of a base plate.
FIG. 3(b) is an external perspective view of an optical fiber mounting component.
FIG. 3(c) is an external perspective view of a direct current electrical interface component.
FIG. 3(d) is an external perspective view of a high frequency electrical interface component.

FIG. 2 is an external perspective view illustrating a schematic configuration of a package 10A for an optical module according to a first embodiment of the present invention. FIG. 3 is an external perspective view illustrating a component configuration of the package 10A for an optical module in a deployed state. FIG. 3(a) is an external perspective view of a base plate 12. FIG. 3(b) is an external perspective view of an optical fiber mounting component 16. FIG. 3(c) is an external perspective view of a direct current electrical interface component 11. FIG. 3(d) is an external perspective view of a high frequency electrical interface component 17.

Referring to the drawings, in the package 10A for an optical module according to the first embodiment, a plurality of (here, four) devices (components) are assembled and fixed on a top surface of the rectangular base plate 12. According to such a configuration, the base plate 12 is a substrate. That is, the package 10A for an optical module includes the optical fiber mounting component 16 of the device mounted on the top surface of the base plate 12 and the electrical interface components (11 and 17) of the device mounted on the top surface of the base plate 12.

Among the components, the optical fiber mounting component 16 is provided in the vicinity of a first transverse side surface of the base plate 12. In addition, the direct current electrical interface component 11 which is one type of electrical interface component is provided in the vicinity of a second transverse side surface of the base plate 12 which faces the first transverse side surface. Furthermore, the high frequency electrical interface component 17 which is another type of electrical interface component is provided in each of the vicinity of a first longitudinal side surface of the base plate 12 and the vicinity of a second longitudinal side surface which faces the first longitudinal side surface. As a result, the package 10A for an optical module includes the optical fiber mounting component 16, the direct current electrical interface component 11, and a pair of the high frequency electrical interface components 17 on a top surface of the base plate 12.

Incidentally, the optical fiber mounting component 16 and the electrical interface components (the direct current electrical interface component 11 and the high frequency electrical interface component 17) are separately manufactured. Then, these devices are separately assembled on the top surface of the base plate 12 and fixed in different modes. Details of the process from assembling to fixing of each of the devices will be described in detail later in conjunction with screws 19 or bolts B and nuts N (with washers W appropriately interposed therebetween) serving as fastening members illustrated in FIG. 2.

Hereinafter, details of a component configuration will be described. Referring to FIG. 3(a), the top surface (the main surface) of the base plate 12 includes a positioning protrusion 12b for determining a mounting position of each of the devices at a predetermined location. Here, the devices include the optical fiber mounting component 16, the direct current electrical interface component 11, and the high frequency electrical interface component 17. The positioning protrusion 12b may position one of the optical fiber mounting component 16 and the electrical interface component (the direct current electrical interface component 11 and the high frequency electrical interface component 17).

Additionally, a total of eight screw fastening holes 12a for fastening and fixing the positioned device with the screws 19 which are examples of the fastening members are provided in the base plate 12. A target mounted using the screw fastening holes 12a corresponds to each of the devices. However, for example, the optical fiber mounting component 16 can be fixed by soldering in combination with fastening with the screws. In such a case, pads for soldering are provided in advance at a position at which the optical fiber mounting component 16 is fixed on the base plate 12 and at a position used for soldering on a bottom surface of the optical fiber mounting component 16. It is not always necessary to use the screws 19 for the screw fastening holes 12a, and it is possible not to use the screws 19 as appropriate according to the type of each of the devices. The screw fastening holes 12a of the base plate 12 are preferably provided in four or more locations according to the type and number of devices to be assembled.

Referring to FIG. 3(b), the optical fiber mounting component 16 is configured as a single piece and includes screw fastening holes 16a at positions corresponding to the screw fastening holes 12a of the base plate 12. Each of the screw fastening holes 16a has a thread on an inner wall portion thereof to accommodate a wall portion having a height around the screw fastening hole 12a of the base plate 12 and to enable the fastening with the screw 19. The screw fastening holes 16a accommodate the screw fastening holes 12a of the base plate 12, thereby, together with the positioning protrusion 12b of the base plate 12, playing a role of positioning the optical fiber mounting component 16 on the base plate 12. However, because the optical fiber mounting component 16 is fixed to the base plate 12 using a solder, the optical fiber mounting component 16 does not need to be fastened with the screws 19 after being positioned by accommodating the screw fastening holes 12a in the screw fastening holes 16a.

Referring to FIG. 3(c), the direct current electrical interface component 11 is configured as a single unit and includes a metal terminal 14, a direct current wiring board 11b, and a pedestal 11c on which the metal terminal 14 and the direct current wiring board 11b are mounted. However, the pedestal 11c may have a form in which either one of the metal terminal 14 and the direct current wiring board 11b is mounted. In addition, screw fastening holes 11a capable of accommodating wall portions having heights around the screw fastening holes 12a provided in the base plate 12 are provided at two separated locations on a bottom surface of the pedestal 11c facing the base plate 12. A thread is also provided on an internal wall portion of the screw fastening hole 11a. That is, the position of the screw fastening hole 11a corresponds to the position of the screw fastening hole 12a provided in the base plate 12, and the screw fastening hole 11a is used for the fastening with the screws 19 in a state in which the screw fastening holes 12a are accommodated therein.

In the direct current electrical interface component 11, the metal terminals 14 are connected to respective connection locations of the direct current wiring board 11b mounted on a top surface of the pedestal 11c by soldering or the like. In the example illustrated in FIG. 3(c), a total of 16 metal terminals 14 are connected to a total of 16 connection locations. The total numbers of the connection locations of the direct current wiring board 11b and the metal terminals 14 are mere examples, and can be freely changed as long as the numbers are plural large enough to satisfy required communication functions.

Referring to FIG. 3(d), the high frequency electrical interface component 17 is configured as a single unit and includes a high frequency wiring board 17b, a high frequency connector 17', and a pedestal 17c on which the high frequency wiring board 17b and the high frequency connector 17' are mounted. However, the pedestal 17c may have a form in which either one of the high frequency wiring board 17b and the high frequency connector 17' is mounted. In FIG. 3(d), a high frequency connector mounting part 17d for mounting the high frequency connector 17' is provided adjacent to one side surface of the top surface of the pedestal 11c. The high frequency connector 17' mounted on the high frequency connector mounting part 17d is illustrated in FIG. 2.

In addition, screw fastening holes 17a capable of accommodating wall portions having heights around the screw fastening holes 12a of the base plate 12 are provided at two separated locations on a bottom surface of the pedestal 17c facing the base plate 12. A thread is also provided on an internal wall portion of the screw fastening hole 17a. That is, the position of the screw fastening hole 17a corresponds to the position of the screw fastening hole 12a provided in the base plate 12, and the screw fastening hole 17a is used for the fastening with the screws 19 in a state in which the screw fastening holes 12a are accommodated therein.

Furthermore, in the high frequency electrical interface component 17, the connection locations of the high frequency wiring board 17b mounted on the top surface of the pedestal 17c are exposed on the high frequency connector mounting part 17d provided adjacent to the one side surface of the top surface of the pedestal 11c. FIG. 2 illustrates an exterior in a state in which the high frequency connector 17' is mounted on and connected to the high frequency connector mounting part 17d. The high frequency electrical interface component 17 is a four-channel high frequency interface of the high frequency connector 17'. However, a detailed structure of the high frequency electrical interface component 17 is omitted in the same manner as the detailed shape of the high frequency connector 17'.

The package 10A for an optical module according to the first embodiment described above has a highly convenient function in which the device can be mounted as it is, even when the number and the mounting position thereof are different according to the device to be mounted. In other words, modularization is possible by positioning each of the devices using the positioning protrusion 12b and the screw fastening holes 12a provided on the top surface of the base plate 12, assembling them separately and fixing them in different modes.

Specifically, the protrusion 12b of the base plate 12 is used for positioning, and the screw fastening holes 12a at corresponding locations are accommodated in the screw fastening holes 16a, so that the optical fiber mounting component 16 is positioned. The screw fastening holes 12a accommodated in the screw fastening holes 16a serve as component mounting parts. Thereafter, the fixing is performed by fastening with the screws 19 using the screw fastening holes 12a and the screw fastening holes 16a, and further the optical fiber mounting component 16 is fixed to the base plate 12 by soldering or the like. In other words, in the case of the optical fiber mounting component 16, when the fixing is performed only by fastening with the screws 19 using the screw fastening holes 12a and the screw fastening holes 16a, it is assumed that a strength at the mounting location is not secured and coupling efficiency of light is lowered. In order to prevent such problems, the optical fiber mounting component 16 and the base plate 12 are further fixed firmly by soldering or the like.

In the optical fiber mounting component 16, when there is a margin in a space other than the optical fiber mounting location, the screw fastening holes 16a can be configured as through holes, and other fastening members illustrated in FIG. 2 can be employed instead of the screws 19. For example, fastening and fixing with general-purpose bolts B and nuts N can be performed. In this case, the bolts B pass through the fastening holes 12a of the base plate 12 and the through holes provided in a height direction of the optical fiber mounting component 16, and the nuts N are fitted from the tip ends of the bolts B and fastened. Thus, the base plate 12 and the optical fiber mounting component 16 are fixed. At this time, washers W may be appropriately interposed between the fastening members which come into contact with the bolts B and the nuts N.

The protrusion 12b of the base plate 12 is used for positioning, and the screw fastening holes 12a at corresponding locations are accommodated in the screw fastening holes 11a provided in the pedestal 11c, so that the direct current electrical interface component 11 is positioned. The screw fastening holes 12a accommodated in the screw fastening holes 11a serve as component mounting parts. Thereafter, the fixing is performed by fastening with the screws 19 using the screw fastening holes 12a and the screw fastening holes 11a. In the case of the direct current electrical interface component 11, it is desirable that components be able to be replaced easily. Therefore, in the fixing of the direct current electrical interface component 11 to the base plate 12, the fixing only by fastening with the screws 19 can improve convenience in both the assembly and the subsequent replacement of components as needed.

In the direct current electrical interface component 11, when there is a margin in a space of a conductive pattern of the direct current wiring board 11b, the screw fastening holes 11a can be configured as through holes, and the fastening and fixing using the bolts B and the nuts N can also be employed. In this case, through holes may also be provided in the direct current wiring board 11b to avoid the conductive pattern of the direct current wiring board 11b and to connect to the through holes provided in the pedestal 11c in the height direction. Then, the bolts B pass through the fastening holes 12a of the base plate 12 and the through holes of the pedestal 11c and the direct current wiring board 11b, and the nuts N may be fitted from the tip ends of the bolts B and fastened. Thus, the base plate 12 and the direct current electrical interface component 11 are fixed. In this case, the washers W may also be appropriately interposed between the fastening members which come into contact with the bolts B and the nuts N.

For the high frequency electrical interface component 17, the protrusion 12b of the base plate 12 is used for positioning, and the screw fastening holes 12a at corresponding locations are accommodated in the screw fastening hole 17a provided in the pedestal 17c, so that the high frequency electrical interface component 17 is positioned. The screw fastening holes 12a accommodated in the screw fastening holes 17a serve as component mounting parts. Thereafter, the fixing is performed by fastening with the screws 19 using the screw fastening holes 12a and the screw fastening holes 17a. In the case of the high frequency electrical interface component 17, it is desirable that components be able to be replaced easily. Therefore, in the fixing of the high frequency electrical interface component 17 to the base plate 12, the fixing performed only by fastening with the screws 19 can improve convenience in both the assembly and the subsequent replacement of components as needed.

In the high frequency electrical interface component 17, when there is a margin in a space of a conductive pattern of the high frequency wiring board 17b, the screw fastening holes 17a can be configured as through holes, and the fastening and fixing using the bolts B and the nuts N can also be employed. In this case, through holes having the same diameter are also provided in the high frequency wiring board 17b to avoid the conductive pattern of the high frequency wiring board 17b and to connect to the through holes provided in the pedestal 17c in the height direction. Then, the bolts B pass through the fastening holes 12a of the base plate 12 and the through holes of the pedestal 17c and the high frequency wiring board 17b, and the nuts N are fitted from the tip ends of the bolts B and fastened. Thus, the base plate 12 and the high frequency electrical interface component 17 are fixed. In this case, the washers W may also be appropriately interposed between the fastening members which come into contact with the bolts B and the nuts N.

However, also in the case of the high frequency electrical interface component 17, it is desirable to take a countermeasure for avoiding the situation in which the coupling efficiency is lowered in consideration of a used frequency band. However, in the case of the high frequency electrical interface component 17, because the high frequency connector 17' is detachably mounted on the high frequency connector mounting part 17d on the top surface of the pedestal 17c, high connection accuracy is maintained in mounting, the coupling efficiency is hardly lowered, and thus no problem occurs.

As described above, according to the package 10A for an optical module, it is assumed that the components are manufactured as separate components so that required interfaces can be flexibly selected according to the device to be mounted on the base plate 12. When the device is an optical semiconductor chip, selection of the interface is particularly effective. For example, the package 10A for an optical module illustrated in FIG. 2 corresponds to an assembly completed image in which one optical interface is mounted on the right, two high frequency parts are mounted on the top and bottom, and one direct current part is mounted on the left as electrical interfaces. Additionally, the components are fixed only by fastening with the fastening member, or fixed further by soldering, and thus the components can be fixed using a simple fixing method of a different mode. Prior to this, the positions of the optical fiber mounting component 16 and the electrical interface component can be easily determined by the screw fastening holes 12a and the positioning protrusions 12b of the base plate 12. Therefore, according to the package 10A for an optical module, the assembling and manufacturing may be easily performed by assembling the components separately and fixing them in different modes.

Figure 4A:
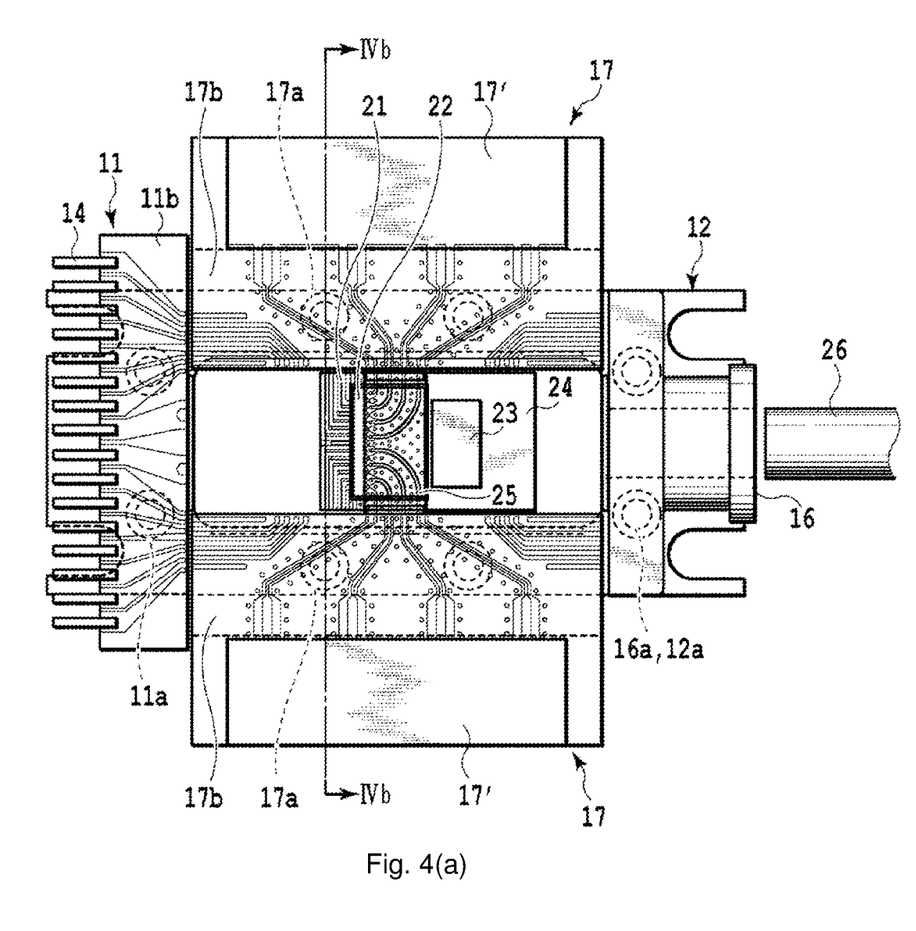
FIG. 4(a) is an overall plan view.
Figure 4B:
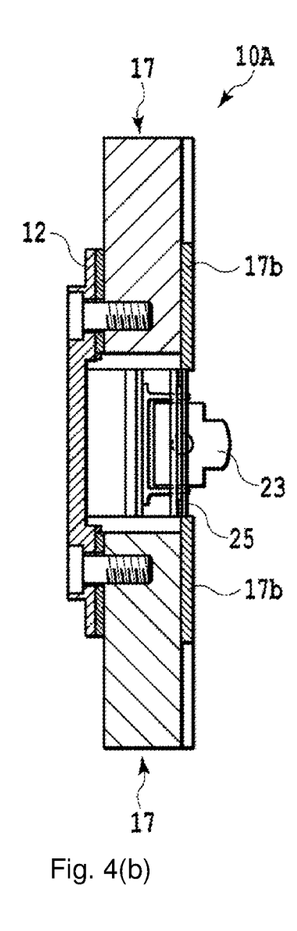
FIG. 4(b) is a side view of the configuration of FIG. 4(a) when seen from the side of the direct current electrical interface component.

FIG. 4 is a view illustrating a detailed configuration of the above-described package 10A for an optical module which includes an optical fiber 26 of a connecting component. FIG. 4(*a*) is an overall plan view. FIG. 4(*b*) is a side view of the configuration of FIG. 4(*a*) when seen from the side of the direct current electrical interface component 11.

Referring to FIGS. 4(*a*) and 4(*b*), the package 10A for an optical module is assembled and manufactured as illustrated in FIG. 2, and then a carrier 24 is delivered to the inside thereof and the optical fiber 26 is mounted in the optical fiber mounting component 16. A direct current wiring board 21, an 8-channel laser array chip 22 in which an optical combiner is integrated, a lens 23, and a radio frequency (RF) wiring board 25 are mounted on the carrier 24.

For the package 10A for an optical module according to the first embodiment, optical coupling power to the optical fiber 26 before the optical fiber 26 was mounted was +2 dBm when a laser current was 80 mA. When the optical coupling power of the package 10A for an optical module after the optical fiber 26 was mounted was examined under the same conditions, it was found that the optical coupling power was +1.8 dBm and favorable results were obtained without a power variation.

On the other hand, a product in which the optical fiber mounting component 16 was fixed only by fastening with the screws 19 using the screw fastening holes 12a and the screw fastening holes 16a when the package 10A for an optical module was assembled and manufactured was used as a comparative example. When the package 10A for an optical module according to the comparative example was examined under the same conditions, the optical coupling power to the optical fiber 26 before the optical fiber 26 was mounted was +2.4 dBm when a laser current was 80 mA. When the optical coupling power of the package 10A for an optical module after the optical fiber 26 was mounted was examined under the same conditions, it was found that the optical coupling power was +0.4 dBm. The results show that a light loss of 2 dB increases.

From the above-described results, it was found that the strength at the location for mounting the fiber mounting component 16 was not sufficiently ensured by simply fixing all the devices to be mounted on the base plate 12 by fastening with the screw 19 and there was a problem in that the coupling efficiency of light was lowered. It is inferred that the same applies to a case in which the fixing by fastening with the bolts B and the nuts N is performed. Thus, as in the case of the package 10A for an optical module according to the first embodiment, a method is applied in which the respective devices are positioned on the top surface of the base plate 12, assembled separately and fixed in different modes. Therefore, in the package 10A for an optical module according to the first embodiment, for the mounting and fixing of the fiber mounting component 16 to the base plate 12, the fixing by fastening with the fastening member and fixing by soldering were performed. In addition, for the mounting and fixing of the electrical interface components (the direct current electrical interface component 11 and the high frequency electrical interface component 17) to the base plate 12, the fixing was performed by fastening with the fastening members.

Figure 5A:
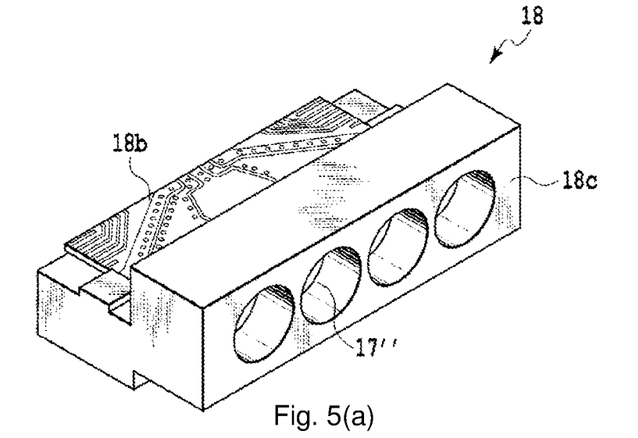
FIG. 5(a) is a perspective view seen from an obliquely upward direction on the front side.
Figure 5B:
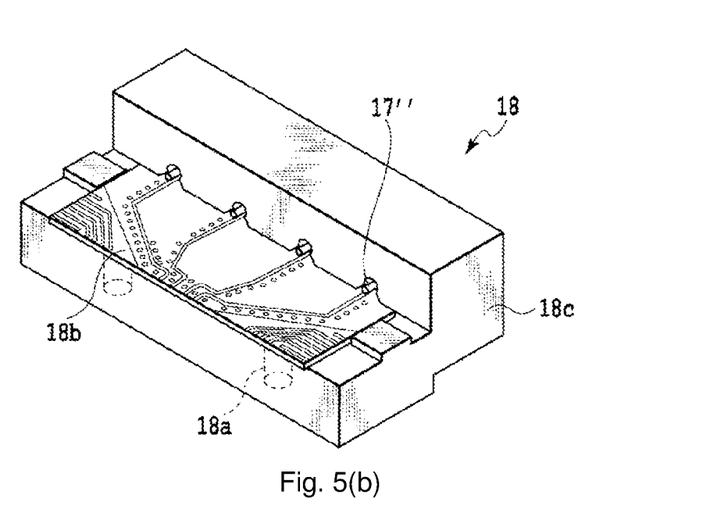
FIG. 5(b) is a perspective view seen from an obliquely upward direction on the back side.

FIG. 5 is an external perspective view illustrating a configuration of an alternative component (the high frequency electrical interface component 18) which is another example of the high frequency electrical interface component 17. FIG. 5(*a*) is a perspective view of the high frequency electrical interface component 18 seen from an obliquely upward direction on the front side. FIG. 5(*b*) is a perspective view of the high frequency electrical interface component 18 seen from an obliquely upward direction on the back side.

Referring to FIG. 5(*a*) and FIG. 5(*b*), the high frequency electrical interface component 18 includes a high frequency wiring board 18b, a total of four high frequency connectors 17", and a pedestal 18c on which the high frequency wiring board 18b and each of the high frequency connectors 17" are mounted. However, the pedestal 18c may have a form in which either one of the high frequency wiring board 17b and each of the high frequency connectors 17" is mounted thereon. The pedestal 18c here includes screw fastening holes 18c which are accommodated in the screw fastening holes 12a of the base plate 12 and serve as component mounting parts.

For the high frequency electrical interface component 18, the protrusion 12b of the base plate 12 is used for positioning, and the screw fastening holes 12a at corresponding locations are accommodated in the screw fastening holes 18a provided in the pedestal 18c, so that the high frequency electrical interface component 18 is positioned. Thereafter, the fixing is performed by fastening with the screws 19 using the screw fastening holes 12a and the screw fastening holes 18a, and the fixing to the base plate 12 by soldering is performed as in the case of the above-described fiber mounting component 16. In this case as well, pads for soldering may be provided in advance at a position at which the high frequency electrical interface component 18 is fixed on the base plate 12 and at a position used for soldering on a bottom surface of the high frequency electrical interface component 18. However, because the high frequency electrical interface component 18 is fixed to the base plate 12 using a solder, the high frequency electrical interface component 18 does not need to be fastened using the screw 19 after being positioned by accommodating the screw fastening holes 12a in the screw fastening holes 18a.

For the high frequency electrical interface component 18, when there is a margin in a space of a conductive pattern of the high frequency wiring board 18b, the screw fastening holes 18a can be configured as through holes, and the fastening and fixing using the bolts B and the nuts N can also be employed instead of the screws 19. In this case, through holes having the same diameter are also be provided in the high frequency wiring board 18b to avoid the conductive pattern of the high frequency wiring board 18b and to connect to the through holes provided in the pedestal 18c in the height direction. Then, the bolts B pass through the fastening holes 12a of the base plate 12 and the through holes of the pedestal 18c and the high frequency wiring board 18b, and the nuts N are fitted from the tip ends of the bolts B and fastened. Thus, the base plate 12 and the high frequency electrical interface component 18 are fixed. In this case, the washers W may also be appropriately interposed between the fastening members which come into contact with the bolts B and the nuts N.

In this manner, although the high frequency electrical interface component 17 of the package 10A for an optical module may be replaced with another high frequency electrical interface component 18, it can be positioned and assembled on the base plate 12 and fixed in a different mode. That is, in this case, because a total of four high frequency connectors 17" independently provided on the pedestal 18c are used, it is preferable to employ both the fixing by fastening with the fastening members and the fixing by soldering. If such assembling and fixing are employed, electrical and mechanical stability is achieved when connection is made to each of the high frequency connectors 17" provided in the high frequency electrical interface component 18.

In such a configuration, only the direct current electrical interface component 11 is fastened with the fastening members, and the optical fiber mounting component 16 and the high frequency electrical interface component 18 are fixed both by fastening with the fastening members and by soldering. Then, the other components are fixed to the base plate 12 together. As a result, even when the number and the mounting position are different according to the device to be mounted, it is possible to guarantee the enhanced convenience of the device being able to be mounted as it is.

The invention claimed is:

1. A package for an optical module, comprising:
   a base plate having a top surface on which a plurality of devices are assembled;
   an optical fiber mounting component mounted on the top surface of the base plate as one of the plurality of devices, the optical fiber mounting component being a separate component from the base plate; and
   an electrical interface component mounted on the top surface of the base plate as one of the plurality of devices, the electrical interface component being a separate component from the base plate and the optical fiber mounting component,
   wherein the optical fiber mounting component and the electrical interface component are separately assembled on the top surface of the base plate and are fixed using different modes,
   wherein the different modes include at least a first mode includes first fixing using a fastening member and then further fixing using soldering and a second mode includes fixing only using a fastening member, and
   wherein the first mode is used on those devices that are shown to have an increased performance when using the first mode over the second mode.

2. The package for the optical module according to claim 1, wherein the optical fiber mounting component is fixed to the base plate using the first mode.

3. The package for the optical module according to claim 1, wherein the base plate includes a positioning protrusion configured to determine a mounting position of at least one of the optical fiber mounting component or the electrical interface component.

4. The package for the optical module according to claim 1, wherein the base plate includes four or more component mounting parts configured to mount at least one of the optical fiber mounting component or the electrical interface component.

5. The package for the optical module according to claim 1, wherein the electrical interface component includes a high frequency wiring board, a high frequency connector, and a pedestal on which at least one of the high frequency wiring board or the high frequency connector is mounted.

6. The package for the optical module according to claim 1, wherein the electrical interface component includes a metal terminal, a direct current wiring board, and a pedestal on which at least one of the metal terminal or the direct current wiring board is mounted.

7. The package for the optical module according to claim 2, wherein the base plate includes four or more component mounting parts configured to mount at least one of the optical fiber mounting component or the electrical interface component.

8. The package for the optical module according to claim 3, wherein the base plate includes four or more component mounting parts configured to mount at least one of the optical fiber mounting component or the electrical interface component.

9. The package for the optical module according to claim 2, wherein the electrical interface component includes a high frequency wiring board, a high frequency connector, and a pedestal on which at least one of the high frequency wiring board or the high frequency connector is mounted.

10. The package for the optical module according to claim 3, wherein the electrical interface component includes a high frequency wiring board, a high frequency connector, and a pedestal on which at least one of the high frequency wiring board or the high frequency connector is mounted.

11. The package for the optical module according to claim 4, wherein the electrical interface component includes a high frequency wiring board, a high frequency connector, and a pedestal on which at least one of the high frequency wiring board or the high frequency connector is mounted.

12. The package for the optical module according to claim 2, wherein the electrical interface component includes a metal terminal, a direct current wiring board, and a pedestal on which at least one of the metal terminal or the direct current wiring board is mounted.

13. The package for the optical module according to claim 3, wherein the electrical interface component includes a metal terminal, a direct current wiring board, and a pedestal on which at least one of the metal terminal or the direct current wiring board is mounted.

14. The package for the optical module according to claim 4, wherein the electrical interface component includes a metal terminal, a direct current wiring board, and a pedestal on which at least one of the metal terminal or the direct current wiring board is mounted.

* * * * *